United States Patent [19]
King

[11] 3,789,251
[45] Jan. 29, 1974

[54] SPRING ARM BEARING RETAINER
[75] Inventor: Dallas E. King, Dayton, Ohio
[73] Assignee: General Motors Corporation, Detroit, Mich.
[22] Filed: Feb. 22, 1973
[21] Appl. No.: 334,677

[52] U.S. Cl. .................................. 310/239, 310/90
[51] Int. Cl. ............................................ H02k 13/00
[58] Field of Search ... 310/238, 239, 242, 245, 246, 310/247, 229, 85, 90, 91

[56] References Cited
UNITED STATES PATENTS

| | | | |
|---|---|---|---|
| 2,919,360 | 12/1959 | Mishima | 310/238 |
| 3,143,677 | 8/1964 | Heiler | 310/239 |
| 3,175,113 | 3/1965 | Simmons | 310/246 |
| 3,013,167 | 12/1961 | Bobula | 310/90 |
| 3,493,802 | 2/1970 | Barthruff | 310/239 |

*Primary Examiner*—R. Skudy
*Attorney, Agent, or Firm*—Paul Fitzpatrick

[57] ABSTRACT

A spring arm bearing retainer performs three functions in a dynamoelectric machine having an armature with a shaft and commutator rotatably supported in a frame and a "floating" brush assembly on the shaft. The main body of the retainer attached to the frame holds a bearing supporting one end of the shaft; and a pair of spaced, parallel, resilient arms projecting from one side of the main body and bent back between the latter and the brush assembly engage the brush assembly to provide axial thrust for the armature against a thrust bearing on the opposite end of the shaft and act as stops to prevent the rotation of the brush assembly with the armature.

4 Claims, 7 Drawing Figures

PATENTED JAN 29 1974　　　　　　　　　　　　　　　3,789,251

SPRING ARM BEARING RETAINER

BACKGROUND OF THE INVENTION

This invention pertains to dynamoelectric machines, and particularly to apparatus for use in an improved armature and brush mounting arrangement. Small DC motors typically have an armature assembly with a shaft rotatably supported in a frame or case in bearings at each end of the shaft, including a thrust bearing at one end. At its other end, the armature assembly includes a commutator, which consists of a cylindrical assembly of axially extending copper bars. Spring means, such as a pair of spring washers, are inserted between the end of the commutator on the armature assembly and a bearing retainer which is attached to the frame to retain the bearing at this end of the armature assembly. The spring means bias the armature assembly against the thrust bearing and thus axially position the armature ssembly. A brush assembly comprises a brush holder circumferentially surrounding the commutator and secured to the frame and a plurality of current collecting brushes circumferentially spaced around and spring biased radially inward toward the commutator. Since the armature assembly, and therefore the commutator, is axially positioned by the spring means and thrust bearing, but the brushes are axially positioned by the placement of the brush holder in the frame, accumulated manufacturing tolerances allow the relative axial positions of the commutator and brushes to vary. In order to insure good contact between the brushes and commutator at all times, it is therefore necessary to give the copper commutator bars extra length in the axial direction.

Since copper is a critical and expensive material, it is desirable to reduce the axial length of the commutator bars. In order to do this without maintaining closer tolerances, a "floating" brush assembly is provided. This brush assembly is held on the armature assembly rather than in the frame and can thus be axially positioned more precisely with respect to the commutator. Of course, means must be provided to prevent the brush assembly from rotating with the armature.

SUMMARY OF THE INVENTION

This invention modifies the bearing retainer to provide means for positioning the brush assembly axially with respect to the commutator, biasing the armature assembly against the thrust bearing and preventing rotation of the brush assembly with the armature. It results in the elimination of a number of parts, such as the brackets for attaching the brush holder to the frame and the spring means mentioned above. In addition to the savings in material, the use of this invention results in faster, more efficient assembly of the motor. Further details and advantages of the invention will be apparent from the description, reference being had to the accompanying drawings, wherein a preferred embodiment of the present invention is clearly shown.

DESCRIPTION OF THE PREFERRED EMBODIMENT

Figure 1:
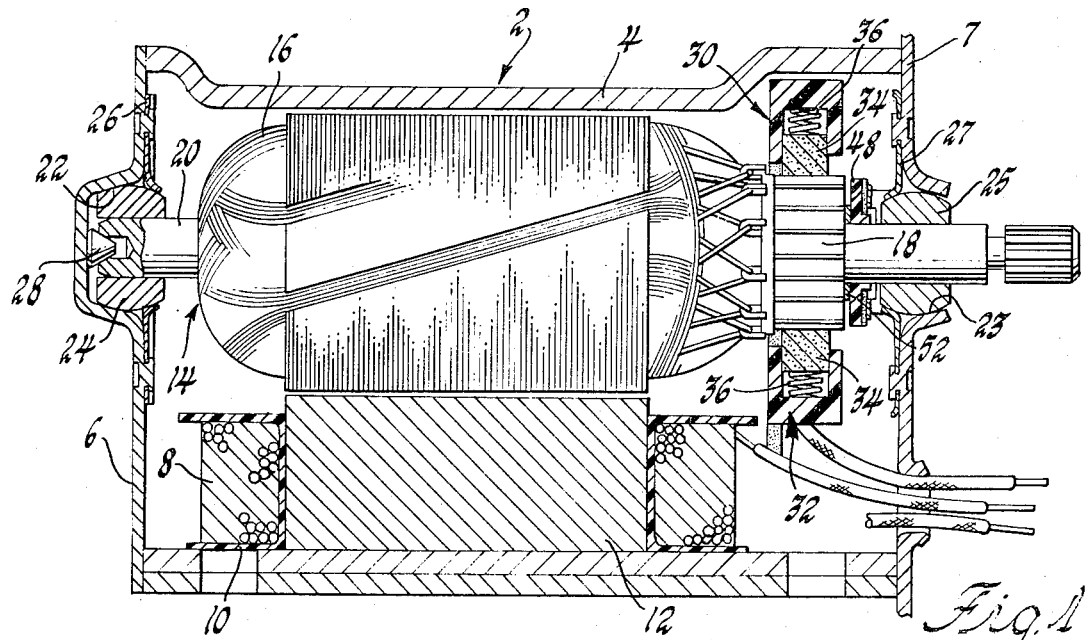
FIG. 1 is a cutaway side view of a dynamoelectric machine containing the bearing retainer of this invention.

Referring to FIG. 1, a dynamoelectric machine, specifically a small DC motor, is shown having a frame 2 comprising a case 4 and end plates 6 and 7. A direct current fed field coil 8, wound on a spool 10, surrounds a pole piece 12 attached to the frame 2. An armature assembly 14 is suspended rotatably within the frame 2. The armature assembly 14 comprises an armature winding 16 and a commutator 18 on a shaft 20. The end plates 6 and 7 include concave bearing pockets 22 and 23. Support bearings 24 and 25 are retained within the bearing pockets 22 and 23 by bearing retainers 26 and 27. The shaft 20 is supported at each of its ends by the support bearings 24 and 25 and is also axially biased against a thrust bearing 28 in the bearing pocket 22 by the bearing retainer 27 in a manner to be fully described below.

A brush assembly 30, comprising a brush holder 32 and a pair of brushes 34 biased radially inward by springs 36, rides on the shaft 20 free of the frame 4 and surrounding the commutator 18 so that the brushes 34 are biased into contact therewith.

Figure 6:
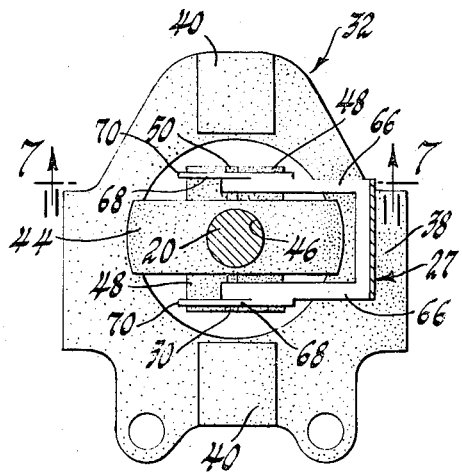
FIG. 6 is a view along line 6—6 of the brush holder of FIG. 5, in which a portion of the bearing retainer of FIG. 2 is also shown to illustrate the cooperation of these parts.
Figure 5:
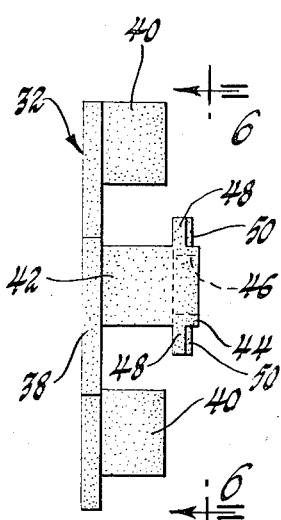
FIG. 5 is a side elevation view of a brush holder for use in conjunction with the bearing retainer of this invention in the dynamoelectric machine of FIG. 1.
Figure 7:
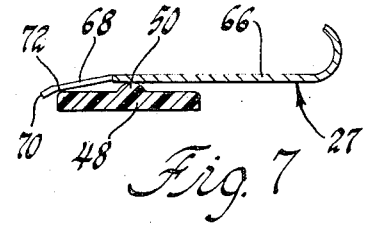
FIG. 7 is a section view along line 7—7 of the arrangement shown in FIG. 6.

Referring to FIGS. 5 and 6, the brush holder 32, made of plastic, comprises a main ring portion 38 which surrounds the commutator 18 and supports brush pockets 40 at the upper and lower ends thereof and extensions 42 at the sides thereof. The brush pockets 40 and extensions 42 are all outside the commutator 18. The brush holder 32 also comprises, extending between the extensions 42 parallel to the main ring portion 38, a contact portion 44, shown in FIG. 6. The contact portion 44 has a central hole 46 and vertically projecting ears 48, each of which possesses a raised vertical ridge 50, the ridges 50 being aligned with each other and with the center of the hole 46. The contact portion 44 is the portion of the brush holder 32 that rides on the shaft 20, which shaft projects through the hole 46. A washer or washers 52, shown in FIG. 1, are provided between the contact portion 44 of the brush holder 32 and the end of the commutator 18; and the spring force of the bearing retainer 27 biasing the contact portion 44 and washer 52 axially against the end of the commutator 18 aligns the brush holder 32 with the commutator 18 in the axial and all radial directions.

Figure 2:
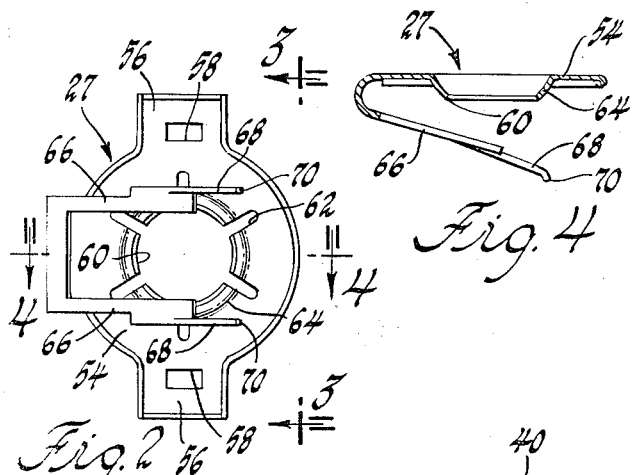
FIG. 2 is an axial view of the bearing retainer of this invention.
Figure 3:
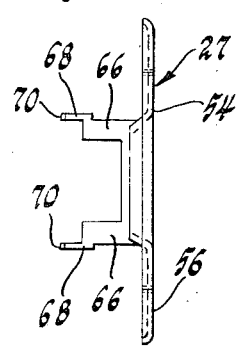
FIG. 3 is a view along line 3—3 of the bearing retainer shown in FIG. 2.
Figure 4:
FIG. 4 is a view along line 4—4 of the bearing retainer shown in FIG. 2.
Figure 4:

FIGS. 2, 3 and 4 show the bearing retainer 27, which is the subject of the invention. The bearing retainer 27 is stamped from steel approximately 0.015 inch thick and comprises a generally annular main body 54 having ears 56 at opposite ends thereof which contain holes 58 for staking and also having a central hole 60 with circumferentially spaced radial slots 62. The portion of the main body 54 adjacent the central hole 60 and contained between the slots 62 is bent out of the plane of the main body 54 to form a concave circular lip 64 for contact with the bearing 25. The retainer 27 also has two spaced parallel arms 66 projecting from one side thereof. The arms 66 are bent between 90° and 180° out of the plane of the main body 54 so that they extend back past the lip side of the main body 54 as shown in FIG. 4. Since the bearing retainer 27 is made of thin steel, the arms 66 are resilient and act as springs when subjected, near their free end, to a force perpendicular to the plane of the main body 54. In addition, each arm 66 is provided with a tab 68 which is joined to the arm 66 in a region removed from the free end of the arm 66 but which extends past that free end, as shown in FIG. 2. Each tab 68 is somewhat narrower than its corresponding arm 66, as shown in FIG. 2, so that it will be more resilient than the arm 66 and thus be able to exert an independent spring force of its own, if deformed, without greatly affecting the spring force of the arm 66, to which it is attached. As shown in FIG. 4, the tabs 68 are bent slightly away from the main body 54; and a small portion 70 at the end of each tab 68 is given a pronounced bend farther in the same direction.

The bearing retainer 27 is staked to the inside of the end plate 7 in the position shown in FIG. 1 with the shaft 20 projecting through the hole 60 and the arms 66 positioned horizontally above and below the shaft adjacent the contact portion 44 of the brush holder 32. The distance between the end plate 7 and the contact portion 44 of the brush holder 32 is short enough that the arms 66 of the bearing retainer 27 abut the raised ridges 50 on the contact portion 44 and are deformed so as to exert an axial thrust on the brush holder 32, which by biasing the contact portion 44 against the washer 52, the washer 52 against the axial end of the commutator 18 on the shaft 20, and the shaft 20 against the thrust bearing 28, results in alignment of the brush holder 32 with the shaft 20. In addition, each ear 48 on the contact portion 44 of the brush holder 32 has a straight vertical edge 72 against which one of the tabs 68 abuts with its end portion 70 bent around the corner of the edge 72 to act as a stop to prevent rotation of the brush assembly 30 with the shaft 20. Since one of the tabs 68 is located above the shaft 20 and the other below it, rotation of the brush assembly 30 in both directions is prevented.

What is claimed is:

1. In a dynamoelectric machine having a frame, an armature assebly including a shaft and commutator means rotatably supported within the frame with support bearing means at the end of the shaft adjacent the commutator means and thrust bearing means at the other end of the shaft, and a brush assembly supported on the shaft free of the frame and adjacent the commutator in engagement therewith;

a member comprising a main body adapted for attachment to the frame for retention of the support bearing therein and an integral pair of spaced, parallel, resilient arms 66 projecting from one side of the main body and bent back between the main body and the brush assembly in expansive engagement with the latter to bias the brush assembly axially against the armature assembly and the armature assembly against the thrust bearing.

2. In a dynamoelectric machine having a frame, an armature assembly including a shaft and commutator means rotatably supported within the frame with support bearing means at the end of the shaft adjacent the commutator means and thrust bearing means at the other end of the shaft, and a brush assembly supported on the shaft free of the frame and adjacent the commutator in engagement therewith;

a member comprising a main body adapted for attachment to the frame for retention of the supporting bearing therein and an integral pair of spaced parallel arms projecting from one side of the main body and bent back into engagement with the brush assembly as stops to prevent the latter from rotating with the armature assembly.

3. The apparatus of claim 1 in which each of the arms carries a tab projecting therefrom for further engagement with the brush assembly as a stop to prevent its rotation with the armature.

4. In a dynamoelectric machine having a frame, an armature assembly including a shaft and commutator means rotatably supported within the frame with support bearing means at the end of the shaft adjacent the commutator means and thrust bearing means at the other end of the shaft, and a brush assembly supported on the shaft free of the frame and adjacent the commutator in engagement therewith, the brush assembly including a brush holder having a contact portion thereof surrounding the shaft and projecting axially toward the support bearing, the contact portion ending in a surface having at least one generally straight edge;

a member comprising a main body adapted for attachment to the frame for retention of the support bearing therein and an integral pair of spaced, parallel, resilient arms projecting from one side of the main body and bent back between the main body and the brush assembly in expansive engagement with the surface of the latter on opposite sides of the shaft to bias the brush assembly axially against the armature assembly, whereby the brush assembly is axially aligned with the armature assembly, and thus to bias the armature assembly against the thrust bearing, each of the arms having a tab projecting therefrom, each of the tabs bending around the edge to form a stop for the prevention of brush assembly rotation.

* * * * *